Sept. 20, 1955     L. T. ADAMSON     2,718,330
TANK HAVING APPARATUS FOR ARRESTING THE SPREAD
OF FIRES AND PREVENTING EXPLOSIONS
Filed July 2, 1951
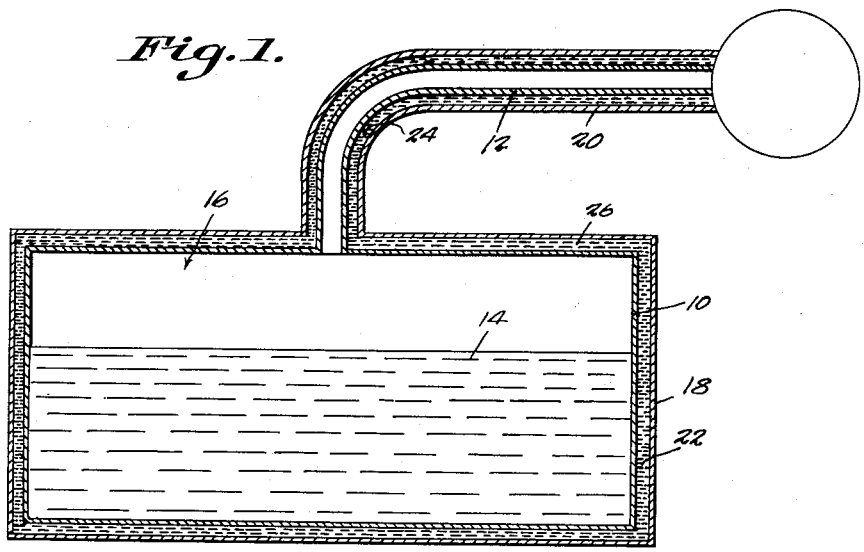
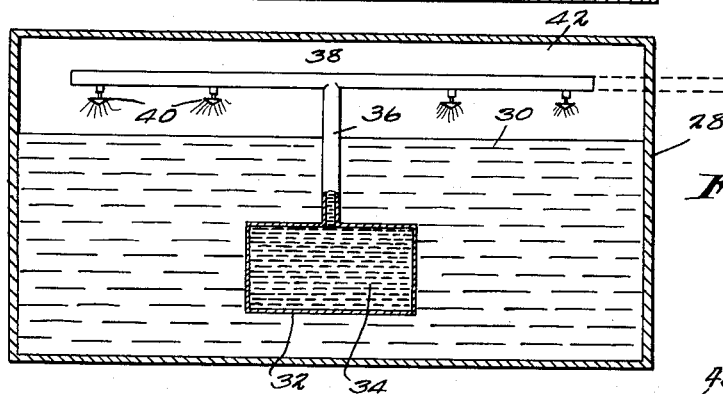
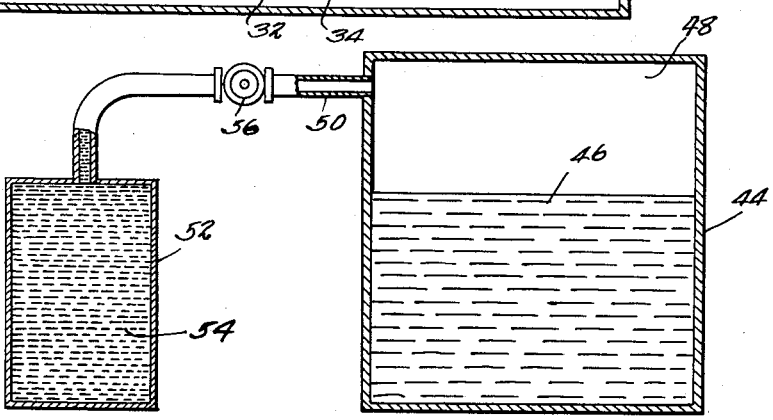
L. T. Adamson
INVENTOR,
BY
ATTORNEYS.

2,718,330

TANK HAVING APPARATUS FOR ARRESTING THE SPREAD OF FIRES AND PREVENTING EXPLOSIONS

Lee T. Adamson, Corpus Christi, Tex., assignor of one-half to Joseph B. Weaver, Corpus Christi, Tex.

Application July 2, 1951, Serial No. 234,804

1 Claim. (Cl. 220—88)

This invention relates to the arresting of the spread of fires and the prevention of explosions, and has for its primary object to protect lives and property from damage through fire or explosion.

Another object is to protect the contents of storage tanks containing volatile and inflammable liquids and to extinguish any flames caused by the ignition of volatile vapors arising from such liquids.

The above and other objects may be attained by employing this invention which embodies among its features introducing into a closed space containing the vapors of a combustible liquid an inert gas and co-mingling said gas with said vapors to dilute the vapors to a degree above which they will not ignite.

Other features include a storage tank for containing a volatile liquid possessing a low flash point, a tank of greater capacity surrounding the storage tank in spaced relation thereto, and a compressed liquified inert gas filling the space between the tanks whereby puncture of the inner tank will cause a mixing of the inert gas with the vapors of the volatile liquid.

Other features include a storage tank for containing a volatile liquid possessing a low flash point, a tank of lesser capacity than the storage tank, said tank of lesser capacity being contained within the storage tank and containing a compressed liquified inert gas, gas discharge means establishing communication between the tank of lesser capacity and the storage tank and thermally controlled means connected with the gas discharge means for opening said means when the volatile liquid attains a predetermined temperature.

Still other features include means for discharging the inert gas from the tank of lesser capacity into the storage tank above the level of the liquid contained in the storage tank.

Referring to the drawings,

Fig. 1 is a sectional view through a storage tank and fuel supply pipe embodying the features of this invention, Fig. 2 is a sectional view through a modified form of the invention illustrated in Fig. 1, and Fig. 3 is a sectional view through a further modification of the invention.

Referring to the drawings in detail a storage tank 10 of any desired capacity has connected thereto a vapor discharge tube 12 which may lead to any suitable source of vapor consumption. The tank 10 contains a volatile liquid 14 possessing a relatively low flash point so that the vapors arising therefrom into the upper portion 16 of the tank 10 and passing through the duct 12 are of a highly volatile and inflammable nature. Such fuel storage tanks are in quite common use on vehicles, boats, and aircraft and present a real hazard not only to lives but to property.

In order to protect lives and property from fire and explosion damage I surround the storage container or tank 10 with a closed receptacle or tank 18 and also enclose the duct 12 with a similar enclosure 20 which communicates with the space 22 between the storage tank and the tank 18 of larger capacity. The space 22 between the storage tank 10 and the space 24 between the duct 12 and its surrounding enclosure are filled with a compressed liquified inert gas 26 which may be of any of the compositions commonly employed in fire extinguishing equipment. Such a storage tank is particularly useful in connection with self-propelled military equipment such as guns, tanks, trucks and aircraft which are subject to damage by bullets or shell fragments, as the puncture of the fuel tank 10 will release the liquified gas 26 so that it can enter the fuel tank 10 and co-mingle with the vapors arising from the liquid 14 and dilute them to a point above which they will not ignite.

In the modified form of the invention illustrated in Fig. 2 a storage tank 28 for a volatile fuel 30 having a low flash point has supported within its interior a tank 32 of lesser capacity containing a compressed liquified inert gas 34 which may be of any composition suitable for the purpose. A pipe 36 leads upwardly from the tank 32 to a point above the level of the liquid 30 in the tank 28 and connected to the upper end of the pipe is a transversely extending duct 38 carrying thermally released discharge nozzles 40 which are designed to direct the inert gas into the space 42 above the level of the liquid 30 within the tank 28.

In the further modification of the invention illustrated in Fig. 3 a fuel tank 44 containing a volatile liquid 46 possessing a low flash point has opening into its upper portion 48 above the level of the liquid 46 one end of a duct 50 which is connected at its opposite end to a tank 52 containing a compressed liquified inert gas 54. A manually actuated shut-off valve 56 is connected in the duct 50 for controlling the opening of the passage therethrough so that when fire danger is encountered, the valve 56 may be opened to introduce into the space 48 of the tank 44 inert gas from the supply 54 which will co-mingle with the inflammable vapors rising from the liquid 46 and dilute them to a point above which ignition thereof will not take place.

From the foregoing it will be evident that the fuel systems of military vehicles including aircraft, as well as fuel tanks such as those now commonly in use may be adequately protected, and the vapors arising from the fuel so diluted that ignition thereof will be inhibited. Consequently protection against fire and explosion may be readily accomplished by employing this invention.

While in the foregoing there has been shown and described the preferred embodiment of this invention it is to be understood that minor changes in the details of construction, combination and arrangements of parts may be resorted to without departing from the spirit and scope of the invention as claimed.

What is claimed is:

Apparatus for arresting the spread of fire and preventing explosions which includes an inner storage tank containing a volatile fluid possessing a low flash point, an outer tank of greater capacity surrounding said inner storage tank in spaced relation thereto, an inner duct communicating at one end with said inner tank, the other end of said duct terminating at a point remote from said inner tank, a second outer duct secured to and communicating with said outer tank while completely enclosing said inner duct, and a compressed liquid inert gas filling the space between said tanks and ducts whereby puncture of said inner tank or duct will cause a mixing of the inert gas with the vapors of the volatile liquid to